Sept. 16, 1930.                C. B. REED                1,775,734
                           PRINTER'S LOCK-UP
                    Filed Sept. 12, 1929      3 Sheets-Sheet 1
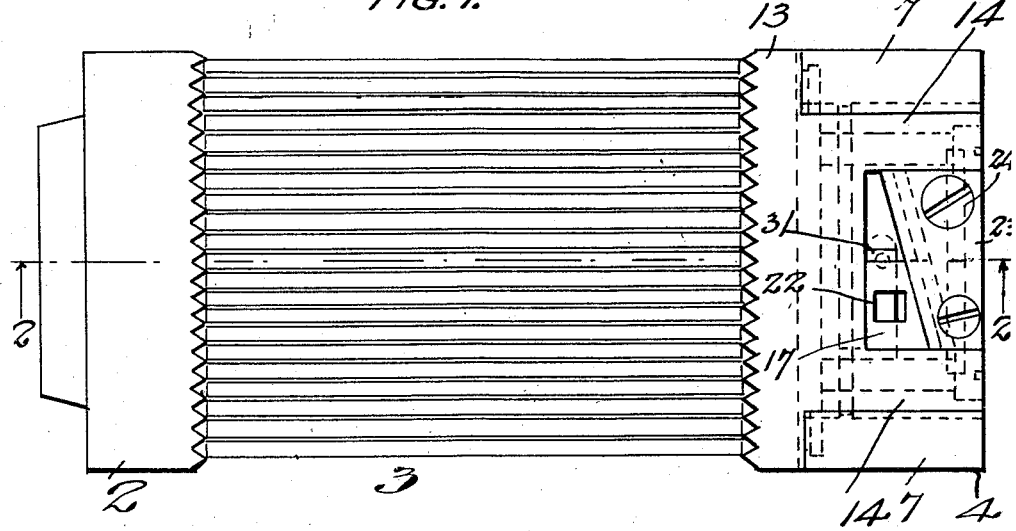
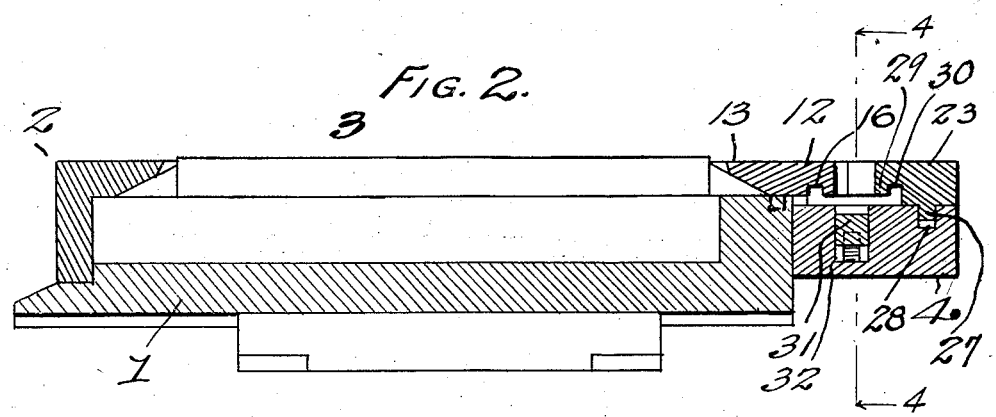
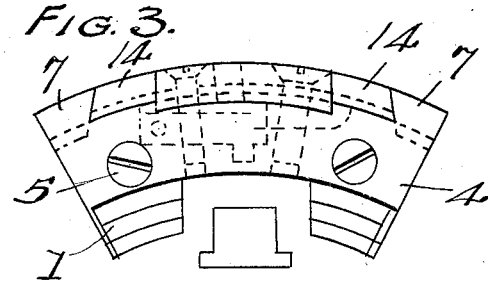
Inventor
CHARLES B. REED
By C. C. Clements
Attorney

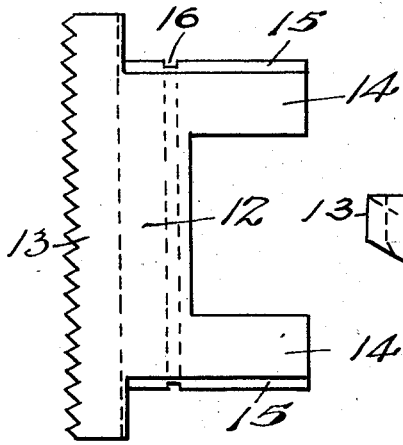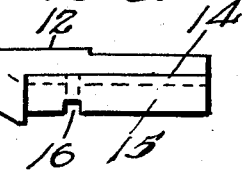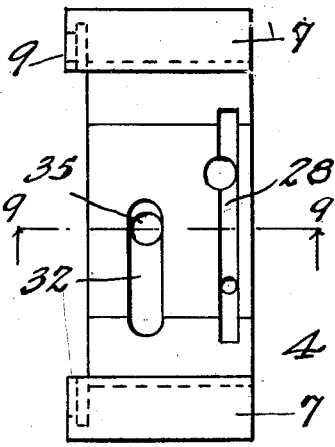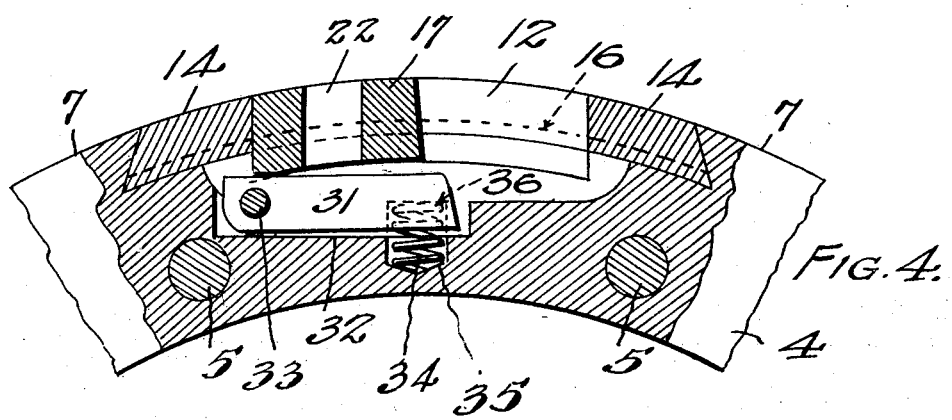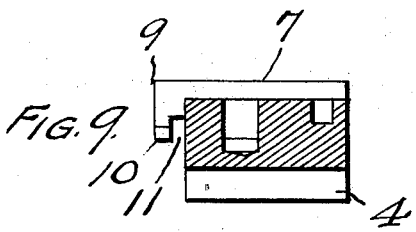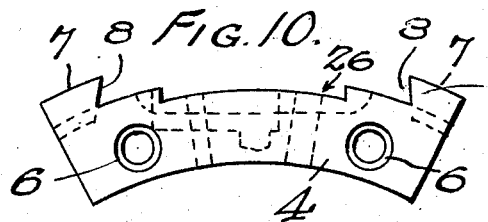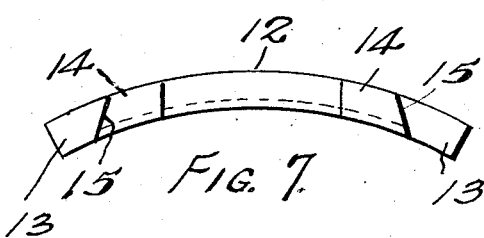

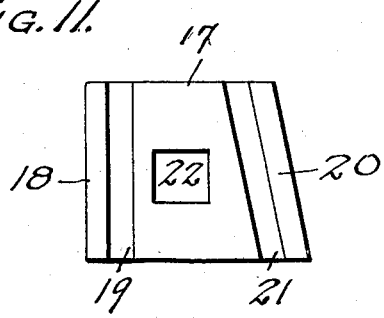
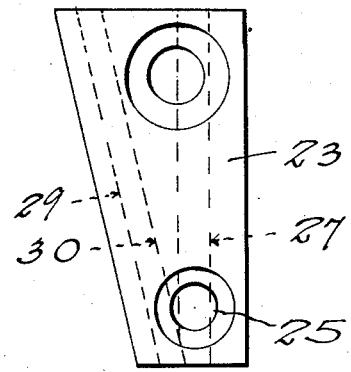
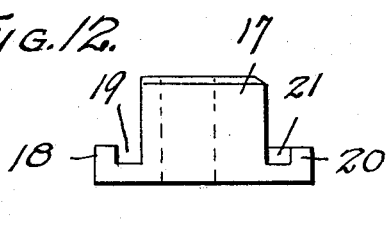
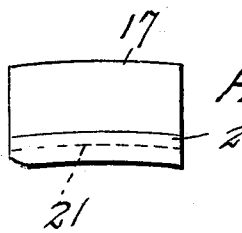
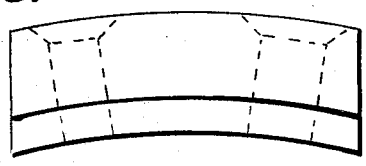
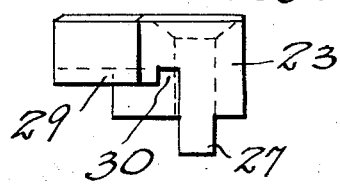
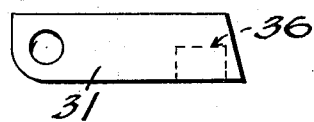
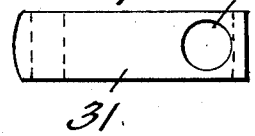

Patented Sept. 16, 1930

1,775,734

UNITED STATES PATENT OFFICE

CHARLES B. REED, OF PHILADELPHIA, PENNSYLVANIA, ASSIGNOR TO CURTIS-MARTIN NEWSPAPERS, INC., OF PHILADELPHIA, PENNSYLVANIA, A CORPORATION

PRINTER'S LOCKUP

Application filed September 12, 1929. Serial No. 392,036.

The primary object of my invention is the provision of a lock-up device for plate cylinders by means of which the plates may with facility and dispatch be securely locked against displacement while on the press. By the utilization of the lock-up device of my invention I overcome the tendency of centrifugal force on the cylinder to loosen the plate. Means are also employed to provide against accidental operation of the device and consequent displacement of the plates. My invention thus provides a manually operated, quick locking and releasing device for the plates of the printing cylinders of rotary presses that saves time, and insures that the presses may be held up to the last minute, and then the plates are clamped, after which the operation of the presses may immediately proceed.

The invention consists in certain novel combinations and arrangements of parts of the lock-up device as will hereinafter be more fully set forth and claimed. In the accompanying drawings I have illustrated one complete example of the physical embodiment of my invention wherein the parts are combined and arranged according to the best mode I have thus far devised for the practical application of the principles of my invention.

Figure 1 is a plan view of so much of a plate cylinder as is necessary to illustrate the utility of my improved lock-up.

Figure 2 is a transverse sectional view at line 2—2 of Figure 1.

Figure 3 is a side view of the lock-up as seen from the right in Figure 1.

Figure 4 is an enlarged detail sectional view at line 4—4 of Figure 1 with parts in elevation.

Figure 5 is a plan view of the clip, detached. Figure 6 is an end view of the clip looking up in Figure 5. Figure 7 is an edge view of the clip looking from the right in Figure 5.

Figure 8 is a plan view of the clip-slide or attaching block curved to conform to the cylinder to which it is attached. Figure 9 is a section at line 9—9 of Figure 8. Figure 10 is an outer face view of the clip-slide or attaching block.

Figure 11 is a top plan view of the locking wedge; Figure 12 is an end view of the wedge; and Figure 13 is a side view of the wedge.

Figure 14 is a top plan view of the back up or wedge block; Figure 15 is an end view; and Figure 16 is a side view of the wedge block.

Figure 17 is a side view of the latch; and Figure 18 is a bottom plan view of the latch or friction detent.

In order that the general arrangement of parts and utility of my device may readily be understood, I have shown in Figures 1 and 2 a portion of the printing cylinder 1, clamp plate 2 fixed at one side of the cylinder, and the plate, or printing medium 3, known in the printing profession as a fudge-block, or late news items for newspapers. The fudge block is used to insert type matter where quick news is required and is used on a fudge cylinder, working in combination with the plate cylinder.

At the side of the cylinder opposite the fixed plate 2 the lock-up device of my invention is mounted in an attaching block 4 in the shape of the segment or arc of a circle to conform to the cylinder and fastened to the cylinder by screws 5 in the screw holes 6. The screw holes are countersunk to receive the screw heads and the screws pass through these holes into the side face of the cylinder, for securely attaching the block to the cylinder face.

The attaching block is fashioned with an upper curved mortise that forms spaced, or end tenons 7, undercut at 8 to form beveled inner adjoining faces, and at the inner side of the block, these tenons, which extend transversely of the cylinder, project at 9 and are formed with longitudinally extending or circumferentially extending flanges 10 which provide undercut grooves 11.

In the mortised attaching block is seated the laterally movable or slidable clip 12, having serrations or teeth at the inner side of its head 13 to grip or clamp against one side of the plate 2. At its outer side or edge the clip is fashioned with a pair of spaced parallel guide arms 14, 14, extending transversely of the cylinder and provided with outer beveled edges 15 complementary to the beveled edges 8 of the attaching block.

As shown in Figures 5 and 6, the under curved face of the attaching block is provided with a guide groove 16 that extends circumferentially of the cylinder.

Lateral movement is imparted to the clip 12 for clamping its head 13 against the plate 3 by means of a slidable wedge 17 which is fashioned with one right angled side having a flange 18 and groove 19; a tapering or wedge face having a flange 20 and groove 21; and a tool socket 22, the latter extending through the wedge.

The wedge is seated in the mortised attaching block, and is movable, circumferentially of the cylinder, between the two arms of the clip, with the flange 18 slidable in the groove 16 at the underside of the clip.

All of the elements of the lock-up device, so far as necessary, are circular or curved to conform to the cylinder, and materials such as machine steel and hardened tool steel are used, and drilled as required.

In addition to being retained and guided by the co-action of the flange 18 in the groove 16, the wedge is also guided and retained by a guide block 23, which is secured by screws 24 in the screw holes 25. The guide block or wedge block 23 is seated in a countersink 26 of the mortised attaching block, and fixed between the two slide arms 14 of the clip at the outer edge of the attaching block, a rib 27 on the underside of the wedge block fitting into a groove 28 of the mortised attaching block as additional locking means for the wedge block. The inner side of the wedge block is tapered or wedge shaped to conform to the complementary shape of the wedge, and the wedge has a rib 29 and groove 30 on its inner face for co-action with the groove 21 and rib 20 respectively of the wedge.

Thus the wedge block is securely screwed and interlocked in the attaching block, to back up the wedge as it is pushed or shoved, by use of a tool in hole 22 of the wedge. As the wedge is advanced in Figure 1, the co-acting, diagonal ribs and grooves of the wedge and wedge block cause the clip to slide to the left and grip or clamp the plate, between the head 13 and the clamp plate 2.

The formation of the tapering slot between the adjoining edges of the clip and wedge block, and the movement of the wedge in the slot, permits ready adjustment of the lock-up device to various widths of plates, columns, &c, and of course the wedge is loosened by backing it to the larger end of the slot as in Figure 1.

For retaining the wedge in adjusted, or clamped position, a latch or spring pressed pawl 31 is used beneath the wedge, as best seen in Figure 4, to engage the under or inner surface of the wedge and frictionally hold it. The pawl is carried in a recess 32 in the attaching block and pivoted on a pin 33 that extends transversely of the cylinder and is mounted in a pin hole in the block to swing outwardly from the axial center of the cylinder. The free end of the pawl is urged outwardly from the axis of the cylinder by means of a spring 34 seated in a socket 35 and projecting into a complementary socket 36 of the pawl.

The tool or wrench used to shove the wedge is also used to press the detent against the tension of the spring and release the detent from the wedge when the wedge is being moved forward or backward, and when pressure is released from the wedge-detent the latter is forced by its spring against the underside of the wedge to hold it against slipping.

Having thus fully described my invention, what I claim as new and desire to secure by Letters Patent is:—

1. The combination with a printing plate cylinder and a fixed, mortised, attaching block, of a transversely slidable clip and a block forming a wedge-slot between the block and clip, and a wedge operatively mounted in the slot.

2. The combination with a mortised attaching block having end tenons, of a laterally movable clip having arms complementary to the tenons, a wedge block between the arms forming a wedge-slot between the latter block and clip, and a wedge operatively mounted in the slot.

3. In a lock-up device, the combination with a mortised block having undercut tenons and a laterally slidable clip having complementary arms with beveled edges, of a wedge block having a diagonal edge co-operating with the clip to form a wedge-slot, and a wedge operatively mounted in the slot.

4. In a lock-up device, the combination with a laterally movable clip having a longitudinally extending groove, of a fixed wedge-block having a diagonally extending groove and co-operating with the clip to form a wedge-slot, a slidable wedge, and complementary ribs on the wedge slidable in the grooves.

5. In a lock-up device, the combination with an attaching block having spaced tenons, of a laterally slidable clip having arms complementary to the tenons, a wedge block between the arms and provided with a diagonal groove, said wedge-block co-operating with the clip to form a wedge-slot, a wedge mounted in the slot and a diagonal rib on said wedge slidable in the diagonal groove, and a longitudinal rib on the wedge slidable in a complementary groove in the clip.

6. In a lock-up device for a printing plate cylinder, the combination with a fixed wedge block, a laterally slidable clip, and a longitudinally movable wedge between the block and clip, of a friction detent for engagement with the wedge, and resilient means for holding the detent in engagement with the wedge.

7. In a lock-up device, the combination with a fixed wedge-block, a laterally slidable clip, and a wedge longitudinally movable between the clip and wedge block, of a spring-pressed pivoted detent in frictional engagement with said wedge.

In testimony whereof I affix my signature.

CHARLES B. REED.